United States Patent
Stevenson

[11] Patent Number: 6,074,294
[45] Date of Patent: Jun. 13, 2000

[54] SINGLE SHAFT FILM VALVE DRIVE

[75] Inventor: Mark W. Stevenson, Appleton, N.Y.

[73] Assignee: Delphi Technologies, Inc., Troy, Mich.

[21] Appl. No.: 09/298,969

[22] Filed: Apr. 23, 1999

[51] Int. Cl.⁷ .................................. B60S 1/54; B60S 1/58
[52] U.S. Cl. ............................................ 454/121; 251/901
[58] Field of Search .............................. 454/121; 251/901

[56] References Cited

U.S. PATENT DOCUMENTS

| | | | |
|---|---|---|---|
| 5,243,830 | 9/1993 | Ito et al. ..................................... | 62/344 |
| 5,632,672 | 5/1997 | Higashihara ............................. | 454/121 |
| 5,653,630 | 8/1997 | Higashihara ............................. | 454/121 |
| 5,890,651 | 4/1999 | Kanda ..................................... | 236/49.3 |
| 5,964,658 | 10/1999 | Aizawa ..................................... | 454/156 |

*Primary Examiner*—Henry Bennett
*Assistant Examiner*—Jiping Lu
*Attorney, Agent, or Firm*—Patrick M. Griffin

[57] ABSTRACT

An automotive air conditioning system mode control film belt that uses a single drive shaft to shift the belt back and forth. The belt follows a continuous loop that begins and ends at the single drive shaft, wrapping around idler rollers, where necessary, to maintain defined runs of the belt against one or more vent windows in a housing. Thin, long, and widely spaced pairs of drive bands at either end of the belt wrap around the single shaft in opposite directions, clear of one another, wrapping or unwrapping from the shaft in opposite directions as it turns in either direction. The belt is thus able to shift back and forth to open or close the vent widows, while air is able to flow unobstructed between the widely spaced belt drive bands and out to the vent windows.

1 Claim, 3 Drawing Sheets

SINGLE SHAFT FILM VALVE DRIVE

TECHNICAL FIELD

This invention relates to air conditioning and ventilation systems in general, and specifically to drive for a flexible film belt damper for such a system that uses a single drive shaft.

BACKGROUND OF THE INVENTION

A newer trend in automotive heating, ventilating air conditioning (HVAC) systems is the use of flexible film dampers to replace conventional flapper door type dampers. Typically, the volume and direction of forced airflow through the evaporator and heater housing is controlled by swinging doors or flappers. Several doors swing back and forth the change the proportion of air that flows through one heat exchanger or the other, and to direct its outlet from one vent opening to another. An inherent drawback of this kind of control, apart from the volume taken up by the swinging arc, is the non linearity of its operation. That is, the door tends to open or close a flow path or vent window completely or not at all, but is very difficult to apportion accurately.

An alternative with potentially much better linearly, which is also more space effective, is a flexible film valve in which a roll of film is rolled back and forth, almost like a window shade, to block or unblock various openings to any degree desired. Existing film valve drives are expensive and complex, however. Two shafts are used with known designs, one to wind up an end of the belt and another to wind it off. Only one shaft may be powered, with the other shaft following along passively, with a return spring or other device used to maintain belt tension.

Other designs drive both shafts actively, although one shaft may be powered indirectly off of the other. Some designs incorporating two driven shafts are quite complex. One example can be seen in U.S. Pat. No. 5243,380. There, each roller is paired with a co axial, co rotating conical pulley located at one end, which is oppositely oriented relative to the conical pulley on the other roller. One roller and pulley pair is directly motor driven, while the other is indirectly driven by the first, either through the film or the wire. In one direction, the film is in tension and serves as the opposite roller driving means, while the wire is slack, and vice versa. Within each roller-pulley pair, as the belt winds up more thickly, the wire moves to a smaller pulley radius, and vice versa. Since the conical pulleys are oppositely directed, as the effective radius of one is growing, the other is contracting, and vice versa. The belt winds in the opposite direction of the wire, so that the winding up roller with its thickening wound layer of belt can rotate more slowly as the winding off roller with its thinning wound layer of belt compensates by rotating more quickly. While the mechanism does work with only one motor, it is somewhat complex, with its extra wires and pulleys. Moreover, the mechanism is very sensitive to misadjustment. Unless the counter rotating rollers and pulleys are timed and registered to one another precisely, the wire will not finish winding up simultaneously with the belt winding off, and vice versa. Repair and adjustment within the small, confined spaces available is very difficult.

SUMMARY OF THE INVENTION

The subject invention takes a very different approach of using a single shaft, which simultaneously winds up and winds off a specially designed flexible film belt.

In the preferred embodiment disclosed, a ventilation housing has at least one planar ventilation window that it is desired to selectively cover and uncover. A single drive shaft is rotatably mounted to the housing parallel to, and spaced from, the plane of the ventilation window. A pair of idler shafts, parallel to the drive shaft, border two sides of the ventilation window, located close to the plane of the window. The drive shaft is powered, while the idler shafts roll freely.

A specially designed film belt has a central span with a vent opening roughly the same size as the ventilation window, or at least large enough to uncover some portion of the window's area. A solid part of the belt central span adjacent to the vent opening has sufficient area to block the window. At either end of the belt, thin, parallel drive bands allow the belt to be wound back and forth on the single drive roller, while still allowing forced air within the housing to reach the vent window. Specifically, a first pair of drive bands are spaced apart roughly equal to the width of the window, while the second pair of drive bands is spaced apart just greater than the first pair of drive bands. The design of the film belt allows it to extend in a continuous loop from the single drive shaft, around one idler shaft, past and close to the plane of the window, around the other idler shaft, and then back to the drive shaft. The two sets of drive bands are wrapped around the drive shaft in opposite directions, so that, as the drive shaft turns, one set winds up as the other winds off, and conversely, while the bands clear one another. Concurrently, the belt's vent opening and/or solid area shift back and forth past the housing's window, blocking or unblocking it to the extent desired. Forced air within the housing can always pass between the wide spaced drive bands to reach the vent window.

DESCRIPTION OF THE PREFERRED EMBODIMENT

Figure 1:
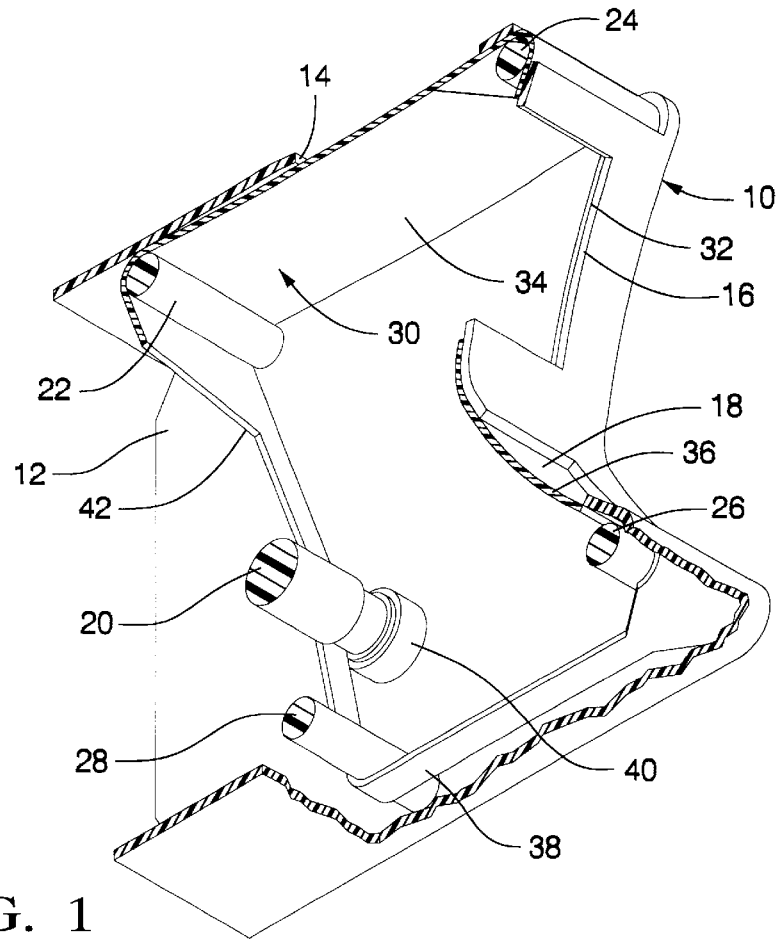
FIG. 1 is a perspective view of a portion of a housing incorporating a preferred embodiment of the invention.
Figure 2:
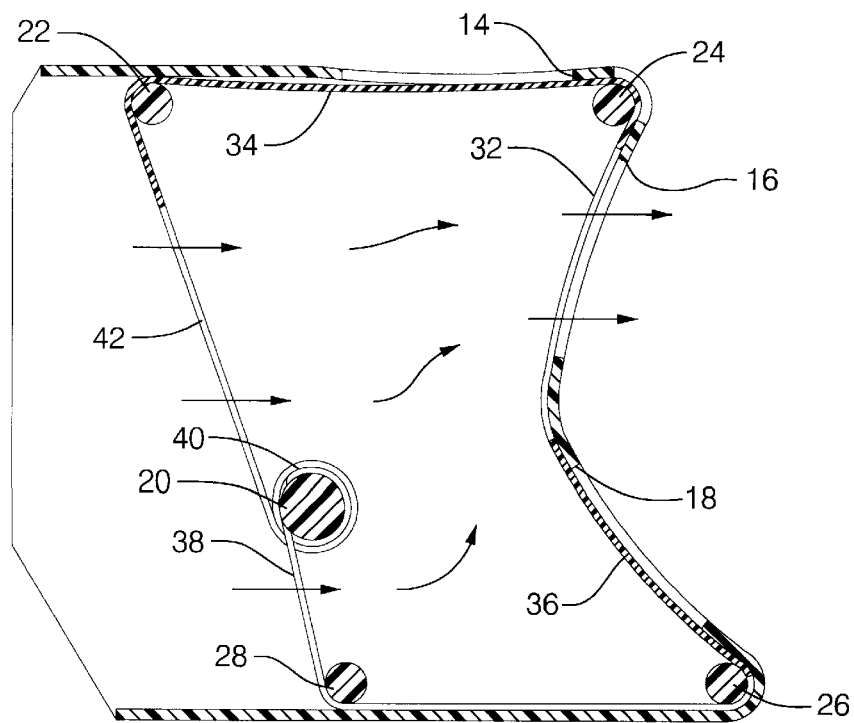
FIG. 2 is a side view of FIG. 1, showing one vent window open, and two others closed.

Referring first to FIGS. 1 and 2, a ventilation housing, indicated generally at 10, is basically a hollow box with an open interior space, closed side walls (one of which is shown at 12), and a front wall that incorporates three separate vent window 14, 16 and 18. Each window is generally rectangular (and planar), and approximately the same rectangular size and shape, with a given width and length. These can be correlated with typical vent windows found within a vehicle interior, the uppermost of which (14) is a defrost window directed at the windshield, the next of which (16) is typically referred to as an air conditioning or A/C window, and the lowest of which (18) is referred to as a heater window. The common names of the windows do not necessarily indicate the temperature of air that exits, however, which can be any temperature, as determined by separate structure not disclosed. The A/C and heater windows 16 and 18 form a slight angle relative to one another, while the uppermost defrost opening 14 forms a large relative to both of the other two.

Forced air of whatever temperature is directed toward the three windows 14, 16 and 18. Here, all that is disclosed is the mechanism that would select among which of the three vent windows would allow the forced, tempered air to exit, and to what degree. This is generally referred to as mode control, as opposed to temperature control.

Still referring to FIGS. 1 and 2, the mode control mechanism of the invention, in the embodiment disclosed, includes a single, powered drive shaft 20. Drive shaft 20 is rotatably mounted between the side walls 12, parallel to and spaced back from all three of the vent windows, 14, 16 and 18. In the specific embodiment disclosed, drive shaft 20 is conveniently placed well behind the inboard edge of defrost window 14, and about level with the solid border between the other two windows 16 and 18. Several idler shafts are provided, all of which are parallel to the single drive shaft 20 (and to one another), and which have defined locations within the housing 10, as determined by the locations of the vent windows 14–18. Specifically, a rear, upper idler shaft 22 is located behind the back edge of the defrost window 14, above the drive shaft 20, close to the inner surface of the housing 10. A front, upper idler shaft 24 is located coplanar to idler shaft 22, just in front of the front edge of the defrost window 14, and just above the upper edge of the A/C window 16. A front, lower idler shaft 26 is located just below the lower edge of the heater window 18. Finally, a rear, lower idler shaft 28 is located coplanar to the idler shaft 26, just below the drive shaft 20. All idler shafts 22, 24, 26 and 28 are also rotatably mounted between the side walls 12 of the housing 10, but all simply rotate freely, and are not actively driven.

Figure 5:
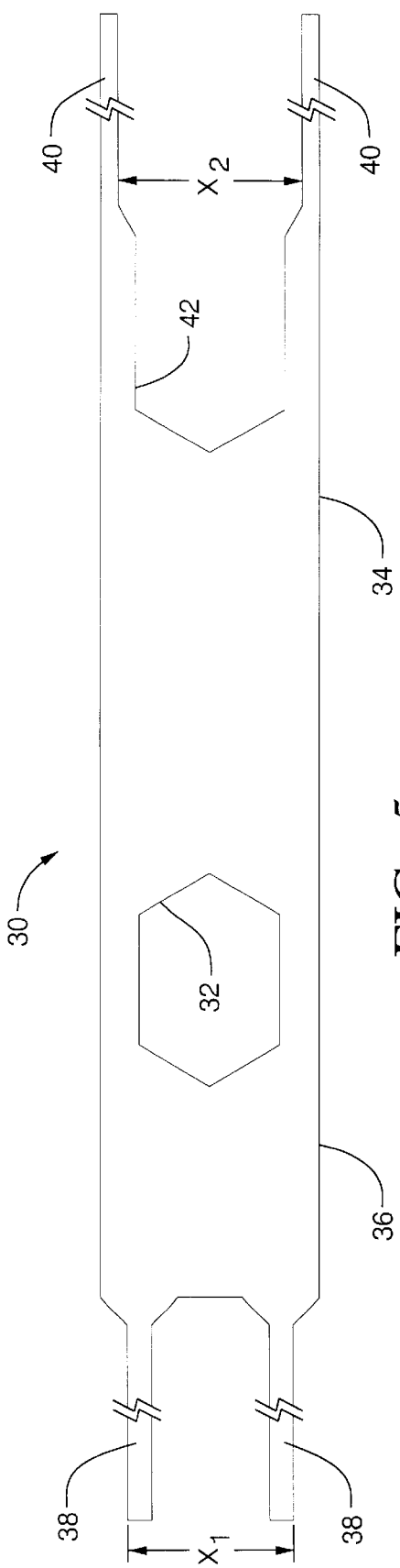
FIG. 5 is a rolled out view of the belt alone.

Referring next to FIG. 5, a continuous film belt, indicated generally at 30, is shown removed and rolled out flat. Belt 30 would consist of any suitably flexible and durable thin material, generally a plastic film. Belt 30 is wider than the common width of the windows 14–18, and long enough to comprise a continuous loop described farther below. A central span of belt 30 includes a first vent opening 32 that is wide and long enough to leave any of the various windows 14, 16, 18 open, when aligned therewith. Adjacent thereto is a first solid section 34, unpierced by any substantial opening, that is long enough (and inherently wide enough) to cover and block any adjacent two windows 14, 16 or 18, when aligned therewith. In the particular embodiment disclosed, a second solid section of belt 36 is long and wide enough to block at least the lower heater ventilation window 18. At each end of the belt 30 is a pair of long, thin, parallel drive bands, which are essentially residual ribbons of material left when the remainder of belt 30 is cut away. A first pair of drive bands 38 is spaced apart approximately equal to the common width of the windows 14–18, and inset from the outer edges of belt 30. A second pair of drive bands 40 is contiguous to the outer edges of belt 30, and spaced apart more widely, at X2, widely enough to clear the first set of drive bands 38. The lengths of the drive bands 38 and 40 are a function of the dimensions of the various windows 14–18, and the placement of the various shafts 20–28, as is described farther below. Finally, in the embodiment disclosed, a second vent opening 42 is located between the second pair of drive bands 40. Second vent opening 42 is effectively the same size as the vent opening 32, but need not have a completely closed perimeter edge, since it is located at the end of a belt solid section 34, rather than in the middle thereof.

Referring again to FIG. 1, the belt 30 is installed within the housing 10 by fixing the ends of each of the drive band pairs 38 and 40 to wind around the drive shaft 20 in opposite directions, while threading the main length of the belt 30 taught around the outside of all of the idler shafts 22, 24, 26 and 28 in a continuous or endless loop. Clearly, the bands 38 and 40 must be long enough to allow the belt 30 to extend around all of the shafts as shown, and also long enough to allow it to be wound back and forth as described further below. The first drive bands 38 wrap around the drive shaft 20 just inboard of, but clear of, the second drive bands 40. The belt 30 is supported by the various idler shafts 22–28 and divided into several flat runs that rest closely against each of the three windows 14, 16 and 18. As the single drive shaft 20 is turned back and forth, by any suitable means (motor or even manually), the two sets of drive bands 38 and 40 wind in opposite direction, onto or off of the drive shaft 20, without interfering with one another. Concurrently, the belt 30 shifts back and forth, and the various windows 14, 16 and 18 will overlap with either vent openings in, or solid sections of, the belt 30, or both, as described in more detail next.

Referring next to FIG. 2, an upper "limit" position of the belt 30 is shown, that is, the position in which the drive bands 40 are fully wound up, and the drive bands 38 are fully wound out. The solid belt section 34 is aligned with defrost window 14, vent opening 32 is in full alignment with A/C window 16, and solid belt section 36 is aligned with heater window 18. Consequently, only A/C window 16 is open, and fully, while the other two are completely blocked or closed. Forced air of whatever temperature inside the housing 10 has a clear path between the widely spaced drive bands 38 and 40, (and/or through the second vent opening 42, which effectively blends into the second drive bands 40), and can reach whatever windows 14, 16 or 18 are open. Here, that is only window 16, and all air flows through it, as shown by the arrows.

Figure 3:
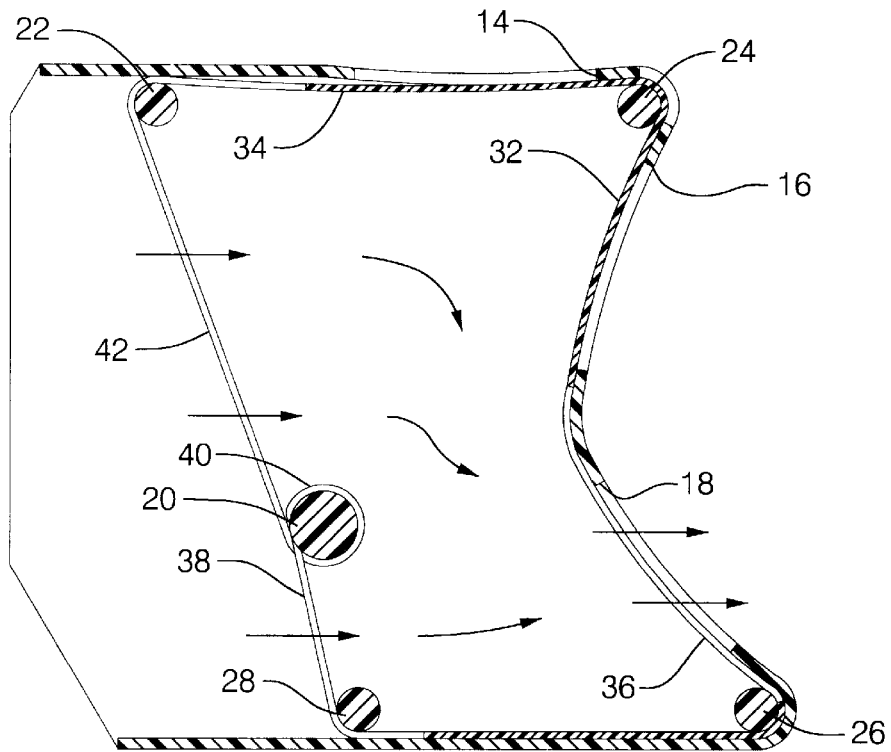
FIG. 3 is a view like FIG. 2, but showing a different vent window open.

Referring next to FIG. 3, as drive shaft 20 turns clockwise, winding drive bands 38 up, and winding drive bands 40 concurrently off, the belt solid section 34 shifts down to cover A/C window 16 as vent opening 32 moves into full alignment with heater window 18 to fully open it. At the same time, belt solid section 34 is sufficiently long to keep defrost window 14 covered and blocked as the belt 30 shifts down. The belt solid section 36 moves down and out of the way between the idler shafts 26 and 28, while the second vent opening 42 moves up and partially past the idler shaft 22, but still short of the defrost window 14. The belt 30 could be stopped anywhere short of the FIG. 3 position, which would put the vent opening 32 partially in line with both of the windows 16 and 18. As before, there is sufficient open space though and between the drive bands 38 and 40 (and through whatever portion of vent opening 42 is still located between idler shaft 22 and drive shaft 20) to allow forced air to freely reach any of the vent windows 14–18 that are open, as shown by the arrows.

Figure 4:
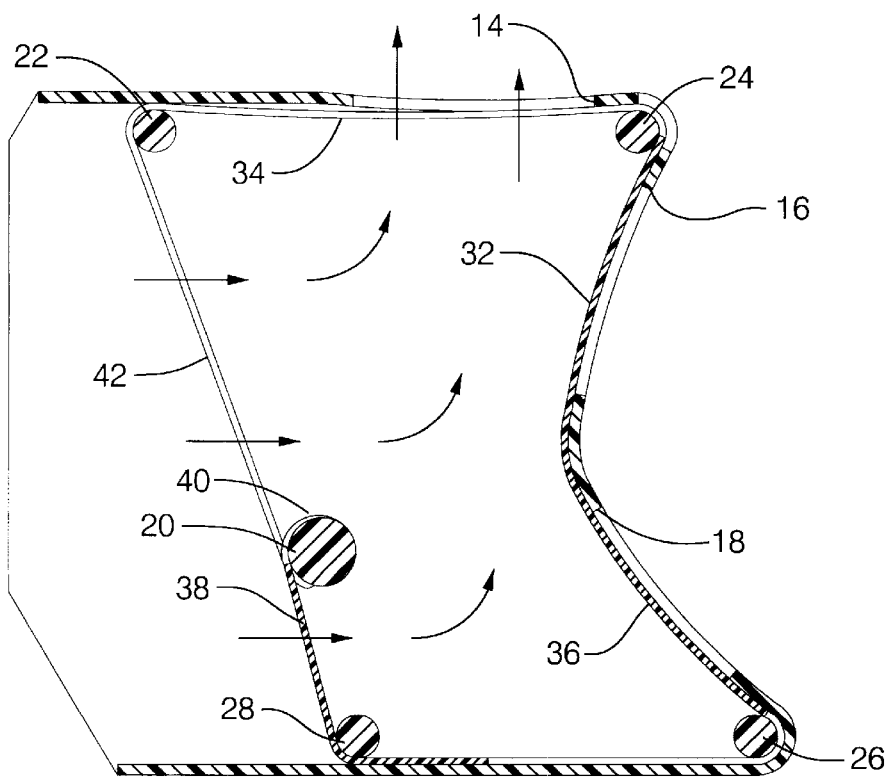
FIG. 4 is a view like FIG. 2, but showing yet another vent window open.

Referring next to FIG. 4, as drive shaft 20 turns further clockwise, to a lower limit position, the drive bands 40 wind fully off, and the drive bands 38 wind fully up. The second vent opening 42 moves into full alignment with the defrost window 14, and the belt solid section 34 covers and blocks the two adjacent windows 16 and 18. The vent opening 32 moves into a storage position between the idler shafts 26 and 28. Concurrently, part of the belt solid section 36 adjacent to the now fully wound up drive bands 38 moves up between the idler shaft 28 and the drive shaft 20. While this would tend to block forced air flow to the lower heater window 18, that window is blocked anyway, and the net result is that forced air flow is deflected up toward the fully open defrost window 14, which is actually beneficial, as shown by the arrows. Before the FIG. 4 lower limit position is reached, however, belt positions are scrolled through in which the vent opening 42 is not yet fully aligned with the defrost window 14, which is only partially unblocked, and the other vent opening 32 is still partially aligned with the heater window 18, which is not yet fully closed and blocked. This is a mode position in which some forced air (generally heated) can exit the still open heater window 18, as some simultaneously reaches the windshield through the only partially open defrost window 14. In that case, however, the lower end of the belt solid section 36 will not have yet moved up between the idler shaft 28 and drive shaft 20, so that forced air flow to the still open heater window 18 will not be blocked.

Variations of the embodiment disclosed could be made. Most simply, a belt with a single vent opening and a single solid, unpierced adjacent section could be used cover and uncover a single vent opening in a forward wall of the housing. In that case, as few as two idler shafts could suffice to run the belt through a loop that was basically triangular in outline when viewed along the axis of the shafts, rather than the more complex polygonal path disclosed. The idler shafts in a very simple case could conceivably be no more than solid shafts or beams, rather than passive rollers, without causing excessive drag force. Generally, however, its desired to operate more than one vent window in mode control, vent windows which, as disclosed, open in widely differing directions. More than two idler shafts would then be needed to provide the more complex belt path, and most likely it would be desired to make them free rolling. The multiple idler shafts disclosed (only two more than the minimally required two) also provide the two "storage" areas between the idler shafts 22–24 and 26–28 in which various runs of the belt 30 can park, after or before moving into operative positions, while remaining out of the way of forced airflow. If desired, one or more of the idler shafts could also be provided with a spring that pushed it continually outwardly and normal to its axis, into the belt, to maintain tension in the loop. This would be far more cost effective that known mechanisms used to coordinate the motion of multiple drive shafts. The drive bands at each end of the belt will be longer or shorter, depending on how far the belt needs to shift back and forth to serve the number of vent windows involved in any particular case. If desired, covers parallel to the housing side walls 12 could be used shield longer, thinner drive bands from the air flow, if there were a vibration or noise concern. Therefore, it will be understood that it is not intended to limit the invention to the particular embodiment disclosed.

What is claimed is:

1. An air conditioning and ventilation system film valve assembly, comprising, a ventilation housing having at least one ventilation window with a predetermined length and width, a single drive shaft within said housing located generally parallel to and spaced from said ventilation window, a pair of idler shafts parallel to said drive shaft and bordering said ventilation window, and, a continuous film belt extending in opposite directions from said drive shaft and around said idler shafts and having a vent opening with a length and width sufficient to substantially overlap said ventilation window and a solid section adjacent to said vent window with a length and width sufficient to substantially block said ventilation window, a first pair of elongated, parallel drive bands at one end of said belt that are spaced apart substantially equal to the width of said ventilation window and a second pair of elongated, parallel drive bands at the other end of said belt that are spaced apart greater than the first pair of drive bands, with the ends of said first pair of drive bands being wrapped around said drive shaft inboard of the ends of said second pair of drive bands, and in the opposite direction thereto, so that, as said shaft turns, said two pairs of drive bands winding onto or off of said drive shaft in opposite directions and clear of one another, thereby shifting said belt back and forth around said idler shafts to selectively cover or uncover said ventilation window while leaving an unobstructed air flow path to said window between said pairs of drive bands.

* * * * *